(12) United States Patent
Konen (10) Patent No.: US 7,293,362 B2
(45) Date of Patent: Nov. 13, 2007

(54) DRILL POWERED CABLE CUTTER

(75) Inventor: Bruce P. Konen, Aurora, IL (US)

(73) Assignee: Ideal Industries, Inc., Sycamore, IL (US)

( * ) Notice: Subject to any disclaimer, the term of this patent is extended or adjusted under 35 U.S.C. 154(b) by 0 days.

(21) Appl. No.: 10/689,474

(22) Filed: Oct. 20, 2003

(65) Prior Publication Data

US 2005/0081388 A1    Apr. 21, 2005

(51) Int. Cl.
 *B26B 15/00* (2006.01)
(52) U.S. Cl. ............................. 30/388; 30/394; 30/228; 83/571; 83/574
(58) Field of Classification Search ................. 30/228, 30/334, 249–250, 205, 187, 210, 247, 92, 30/388–394, 519, 196, 216; 83/580, 600, 83/603, 571, 574, 629; 74/63–75, 25, 35, 74/665 GC, 606 R; 408/20, 135, 713, 712, 408/241 S
See application file for complete search history.

(56) References Cited

U.S. PATENT DOCUMENTS

| 2,256,779 | A | * | 9/1941 | McHenry | 30/241 |
| 2,268,728 | A | * | 1/1942 | Toop | 30/228 |
| 2,695,667 | A | * | 11/1954 | Carroll | 83/613 |
| 2,760,265 | A | | 8/1956 | Draenert | |
| 2,794,463 | A | * | 6/1957 | Ford et al. | 144/92 |
| 2,840,904 | A | * | 7/1958 | Hutchins | 30/210 |
| 2,982,320 | A | * | 5/1961 | Trumbull et al. | 30/373 |
| 3,025,599 | A | | 3/1962 | Sauers et al. | |
| 3,370,352 | A | | 2/1968 | Steely | |
| 3,449,992 | A | | 6/1969 | Hanaway | |
| 3,858,317 | A | | 1/1975 | Ford et al. | |
| 3,973,449 | A | * | 8/1976 | Berlinger, Jr. | 74/421 A |
| 4,317,282 | A | * | 3/1982 | Pace | 30/122 |
| 4,369,576 | A | * | 1/1983 | McVaugh | 30/228 |
| 4,682,416 | A | | 7/1987 | Stolfa | |
| 4,747,212 | A | | 5/1988 | Cavdek | |
| 4,769,911 | A | | 9/1988 | Araki | |
| 4,774,848 | A | * | 10/1988 | Zupancic | 74/425 |
| 4,998,351 | A | | 3/1991 | Hartmeister | |

(Continued)

FOREIGN PATENT DOCUMENTS

DE    39 39 816 A1    6/1991

*Primary Examiner*—Boyer D. Ashley
*Assistant Examiner*—Omar Flores Sanchez
(74) *Attorney, Agent, or Firm*—Cook, Alex, McFarron, Manzo, Cummings & Mehler, Ltd.

(57) ABSTRACT

A cable cutter for attachment to a power drill has a housing, first and second cutting blades connected to the housing for movement relative to one another and a drive assembly releasably engageable with the chuck of the drill and operatively engaged with at least one of the cutting blades. The drive assembly includes a worm mounted on a drive shaft, a worm gear and a drive gear mounted on a main shaft, and a segment gear formed on one of the cutting blades. The worm and worm gear which are in engagement, as are the drive gear and segment gear. The main shaft is supported in the housing by three bearings. A torque arm is attached at one end to the housing and adapted at its other end to engage the handle of the drill. A reversible stabilizing handle attaches to the housing to allow the user to securely grip the housing during cutting operations.

2 Claims, 6 Drawing Sheets

U.S. PATENT DOCUMENTS

| | | | |
|---|---|---|---|
| 5,067,240 A | * 11/1991 | You | 30/249 |
| 5,243,760 A | 9/1993 | May, Jr. | |
| 5,371,947 A | * 12/1994 | Dickey et al. | 30/122 |
| 5,579,584 A | * 12/1996 | Hoffman | 30/391 |
| 5,642,566 A | 7/1997 | Hirabayashi | |
| 5,755,293 A | 5/1998 | Bourke | |
| 5,901,447 A | 5/1999 | Dunning | |
| 5,987,754 A | 11/1999 | Hirabayashi et al. | |
| 6,065,212 A | * 5/2000 | Lazarevic | 30/101 |
| 6,155,916 A | * 12/2000 | Rudolf et al. | 451/344 |
| 6,178,643 B1 | 1/2001 | Erbrick et al. | |

* cited by examiner

Fig. 1

DRILL POWERED CABLE CUTTER

BACKGROUND OF THE INVENTION

The present invention relates to cable cutters and, in particular, to a drill-powered cable cutter which can be removably attached to a standard, hand-held power drill having a rotating chuck and handle.

Cable cutters are used to cut large electrical cables of the type used in high voltage or high current applications. Such cables can vary in diameter but generally they can be an inch in diameter or larger. This class of cable is too large to be cut using ordinary hand tools. Ratchet cable cutters are known which require repeated actuations to slowly force a cutting blade through a cable. These tools are slow and they can potentially cause injuries in larger cables due to the repeated actuations required. Other prior art hand tools have elongated handles for extra leverage to cut larger diameter cables, but these tools are so large as to be unwieldy and inconvenient to carry around. This has lead to the development of power tools for cutting large electrical cables. One such tool is shown in U.S. Pat. No. 5,987,754. It has a planetary gear train to drive its cutting blade. Another powered cable cutter is disclosed U.S. Pat. No. 6,178,643 which has a cutter driven by a hand-held drill but it uses a complicated ratchet and linkage mechanism. It has been found desirable to simplify the driving mechanism needed to drive the cutting blades to slice through the cable.

Other drawbacks of prior cable cutters include the weight and bulk of an electric motor and power source therefor which are built into the cutting tool. Such built-in motors are dedicated solely to the cable cutter and can be used for that tool and nothing else. Meantime, electricians almost always carry with them a standard hand-held power drill. Today these are usually battery driven, although drills with electric power cords are still found. In any case, a tool with a dedicated motor and power supply simply duplicates the equipment an electrician already has. This adds cost, weight and bulk to the equipment needed for a particular job. Naturally, electricians prefer to limit the amount of extra weight that they need to carry around on a daily basis. So it is desirable to provide a cable cutter which works with the electrician's existing tools without unnecessarily adding to them.

SUMMARY OF THE INVENTION

The present invention provides a cable cutter for large electric cables which is portable and is releasably engageable with any standard hand-held power drill. The drill-powered cable cutter includes a housing and first and second cutting blades mounted on the housing for movement relative to one another. The cutter further includes a drive assembly which includes a drive shaft mounted for rotation in the housing and extending from the housing so as to be releasably engageable with the chuck of the power drill. The drive assembly operatively engages at least one of the cutting blades for moving the blades relative to one another.

The drive assembly includes a simple worm and worm gear construction. The worm is mounted on the drive shaft and rotates with the shaft along a first axis. The worm gear is mounted on a worm gear shaft along a second axis which is perpendicular to the first axis. The worm gear shaft is supported by three separate bearings. It has been found that three bearings are needed to prevent failure of the worm gear shaft. The worm engages the worm gear for rotation of the worm gear and the worm gear shaft. The worm gear shaft carries a drive gear which operatively engages at least one of the cutting blades for moving one of the blades relative to the other. A segment gear formed on at least one of the cutting blades engages the drive gear.

A torque arm is slidably attached at one end to the cutter housing. A torque arm clamp releasably fixes one end of the torque arm to the housing. The other end of the torque arm has a hook which is adapted to curve around the handle of the drill. The torque arm is arranged so it will adapt to any size drill. The torque arm counteracts the torque produced on the cutter by the rotational movement. In other words, it prevents the housing from spinning relative to the power drill. The torque arm will also prevent the cutter from inadvertently falling when the cutter is disconnected from the drill.

DETAILED DESCRIPTION OF THE INVENTION

Figure 1:
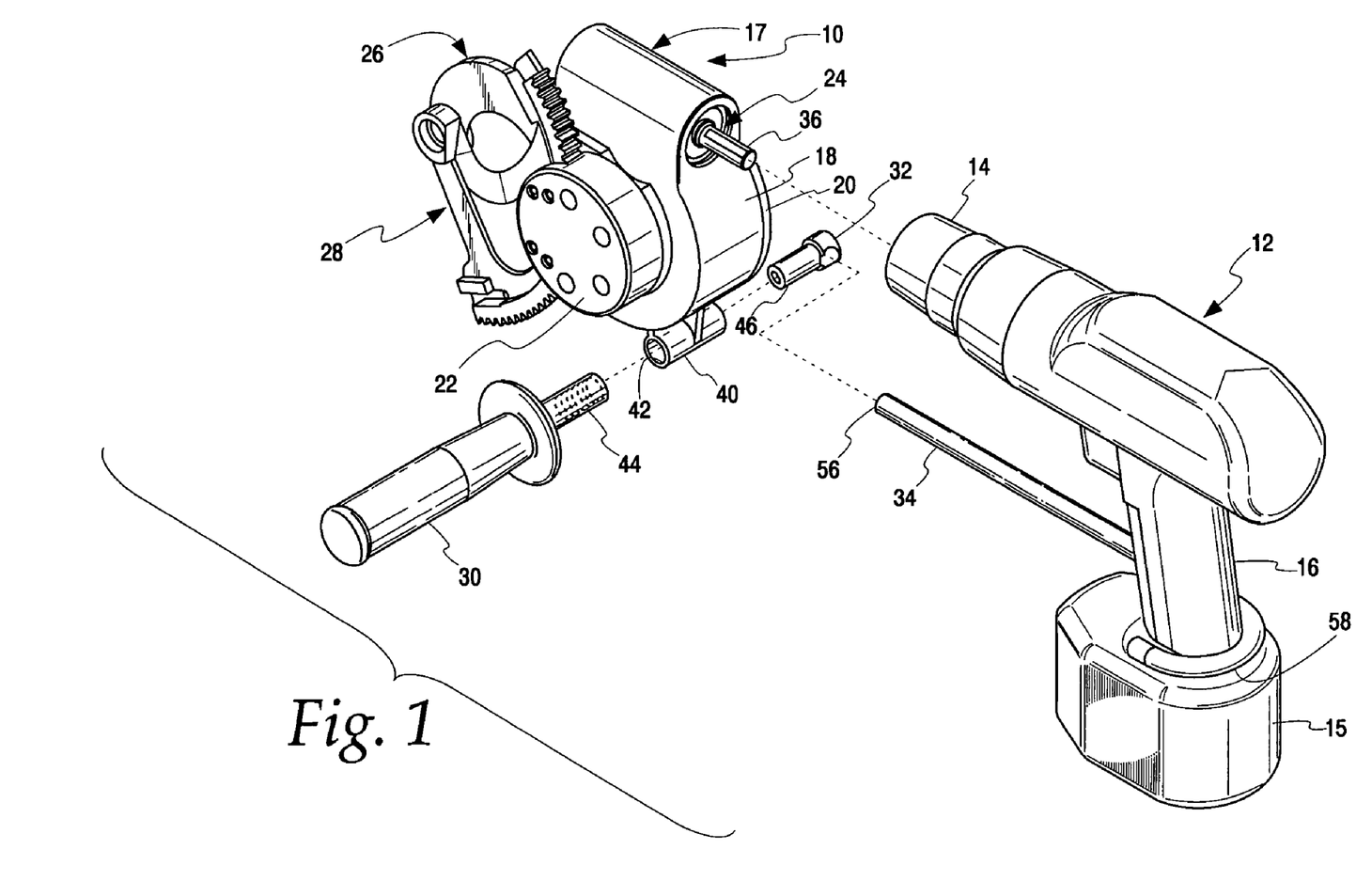
FIG. 1 is an exploded perspective view of the cable cutter and a hand-held power drill.

The cable cutter of the present invention is shown generally at 10 in FIG. 1. The cutter is adapted for removable engagement with a standard, hand-held power drill 12. The drill includes the usual chuck 14 and handle 16. A battery pack 15 may be attached at the bottom of the handle. For purposes of description the front of the cutter will be considered the portion facing the drill 12 in FIG. 1. Accordingly, the right side of the cutter is the side with the cover 20 while the left side of the cutter is the side with the end cap 22. This is the orientation that would most commonly be seen by a user when operating the cable cutter. Thus, references herein to the lateral direction will mean along the left-right direction while references to the longitudinal direction will mean along the front to back direction, i.e., parallel to the axis of the drive shaft 36.

Continuing with a description of the major components of the cable cutter in FIG. 1, there is a main body or enclosure indicated generally at 17. This enclosure includes a worm housing 18, a worm cover 20 and an end cap 22. There is a drive assembly 24 which is largely inside the enclosure 17 such that only the drive shaft 36 is visible in FIG. 1. A cutting blade assembly includes a first or stationary cutting blade 26 and a second or movable cutting blade 28. A reversible stabilizer handle 30 is connectable to a sleeve 40 on the worm housing 18. The handle is held in place by a torque arm clamp 32. A torque arm 34 has a first end 56 which fits through a bore in the torque arm clamp. The torque arm further includes a second end that has an attachment element formed thereon. In the illustrated embodiment the attachment element is in the form of a hook 58 that fits around the drill handle 16 just above the battery pack 15.

Figures 10, 11, 12, 13, 14:
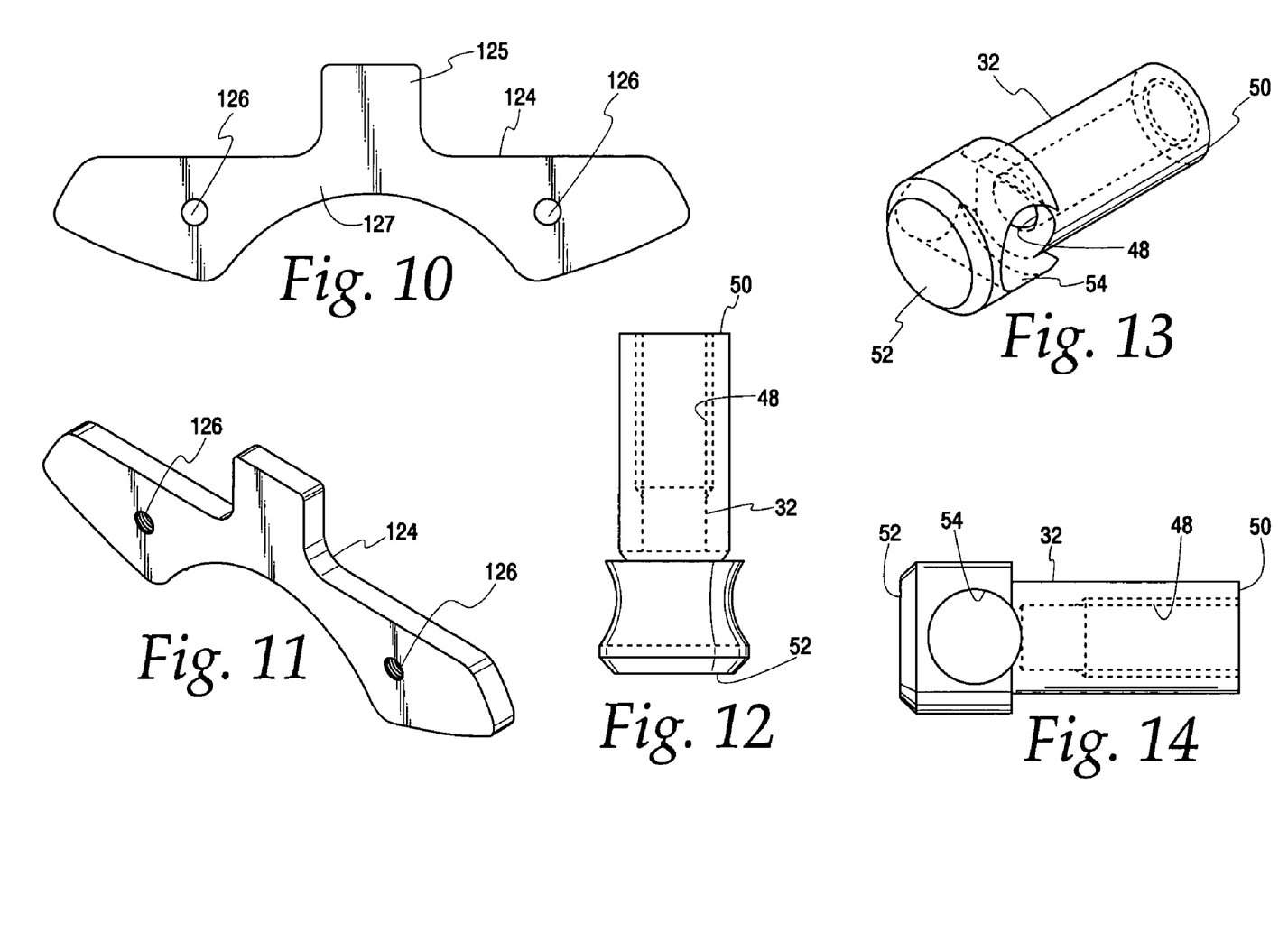
FIG. 10 is an elevation view of a wear plate.
FIG. 11 is a perspective view of the wear plate of FIG. 11.
FIG. 12 is a plan view of the torque arm clamp.
FIG. 13 is a perspective view of the torque arm clamp.
FIG. 14 is a side view of the torque arm clamp.

Further details of the torque arm clamp 32 are shown in FIGS. 12-14. The clamp has a cylindrical body 50 having an internally-threaded bore 48 formed therein. A head 52 is attached to one end of the body 50. A cross hole 54 extends all the way through the head 52. The cross hole is sized to receive the first end 56 and the shank of the torque arm 34. It will also be noted that the location of the cross hole is such that it extends across the intersection of the head 52 and body 50, as best seen in FIG. 14. Returning again to FIG. 1, it is pointed out that the external diameter of the body 50 allows it to fit snugly but slidably within a bore 42 formed in and through the sleeve 40. The stabilizer handle 30 has an externally-threaded projection 44 at one end thereof. The outside diameter of the projection 44 allows it to threadedly engage the bore 48 in the torque arm clamp.

Figures 8, 9:
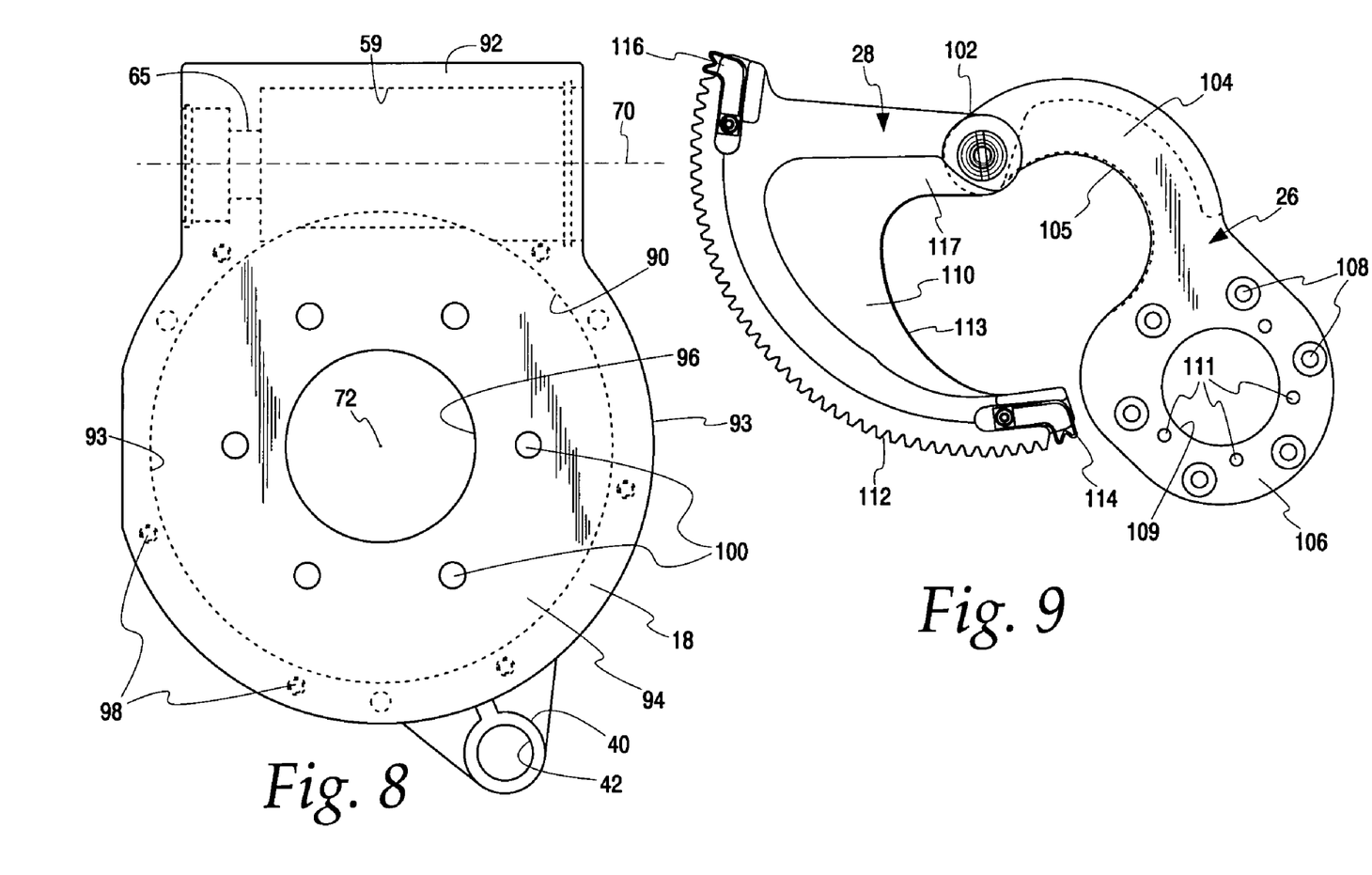
FIG. 8 is a left side elevation view of the worm housing.
FIG. 9 is an end elevation view of the cutting blades, shown rotated about 90° from their positions as shown in FIG. 2.

Turning attention now to the construction of the enclosure 17, details of the worm housing 18 are shown in FIG. 8. The worm housing has a generally circular main plate 94 having a central opening 96 therein. The opening defines a lateral axis 72. Six screw-receiving holes 100 are formed about the opening 96. The top of the main plate 94 merges with a generally semi-cylindrical upper wall 92. The upper wall defines a worm-receiving space 59 having a longitudinal axis 70. A necked down portion 65 of the upper wall is engageable with a thrust bearing as will be explained below. A laterally-extending arcuate outer wall 93 is formed about the periphery of the main plate 94 and merges with the upper wall 92. The sleeve 40 is attached to the outer wall 93. A plurality of screw-receiving holes 98 are formed in the outer wall. Together the outer wall 93 and the main plate define a gear-receiving chamber 90.

Figures 2, 3, 4:
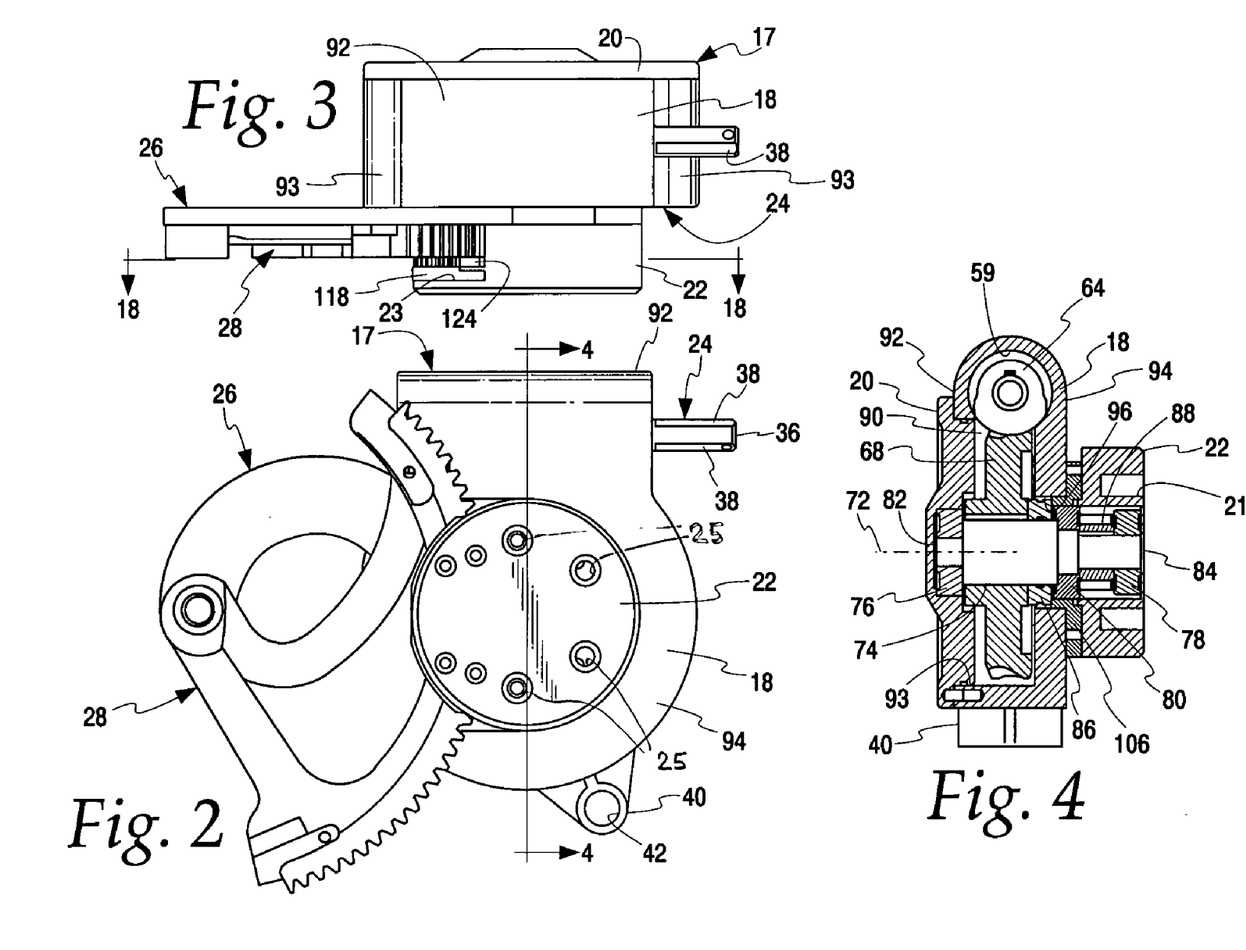
FIG. 2 is left side elevation view of the cable cutter of the present invention, with the torque arm removed for clarity.
FIG. 3 is a top plan view of the cable cutter.
FIG. 4 is a section taken along line 4-4 of FIG. 2.

As shown in FIGS. 3-6, the gear-receiving chamber 90 is closed off on the right side by a worm cover 20. The cover is held in place by screws or the like engaging the cover and threading into the holes 98 in the outer wall 93. One such screw is visible in FIG. 4. FIG. 4 also illustrates that the cover 20 has a thickness sufficient to allow a counterbore to be formed therein, centered on the lateral axis 72.

Figures 5, 6, 7:
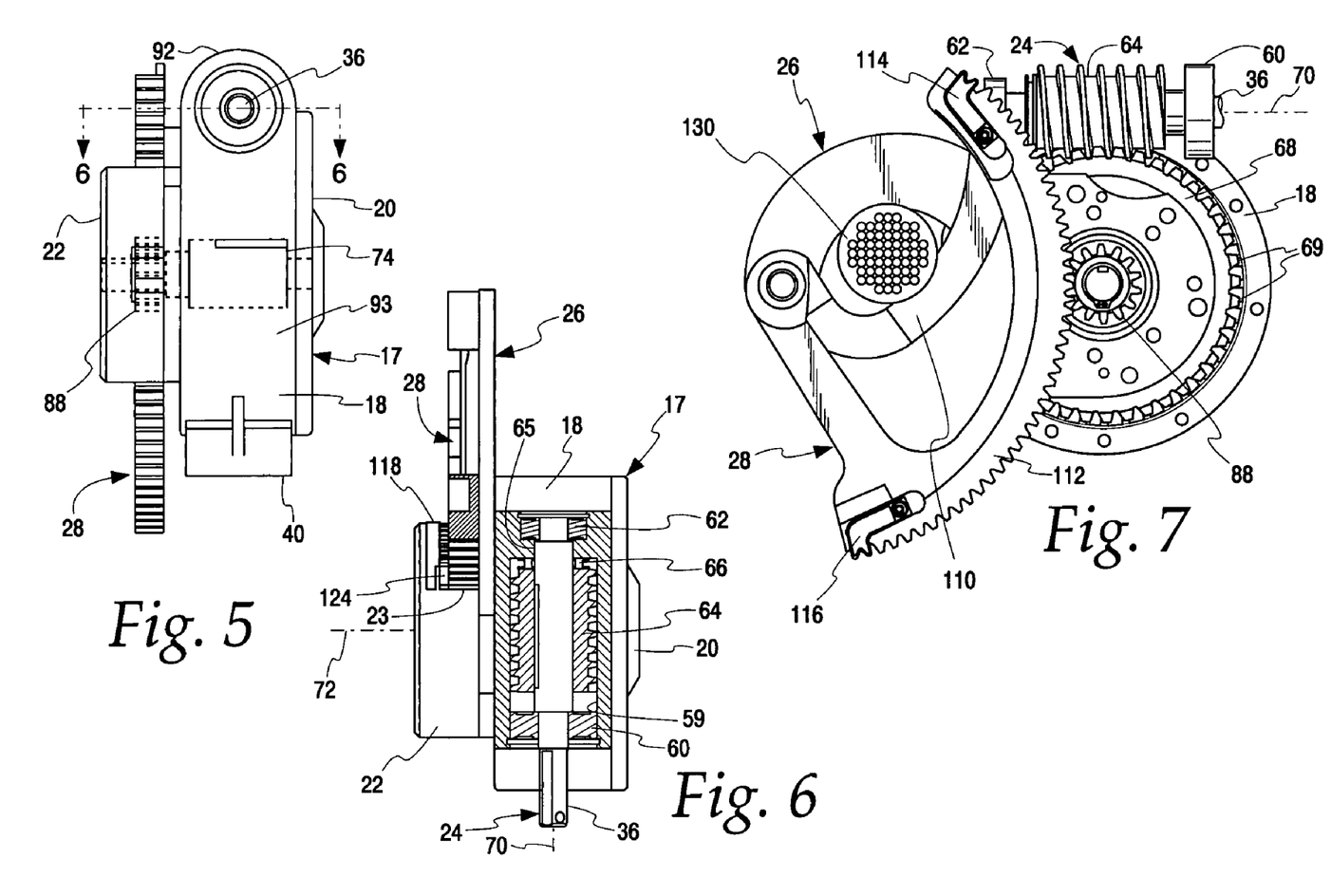
FIG. 5 is a front elevation view of the cable cutter.
FIG. 6 is a section taken along line 6-6 of FIG. 5.
FIG. 7 is left side elevation view of the drive assembly with portions of the housing removed to reveal the relationship of the parts of the drive train.
Figure 15:
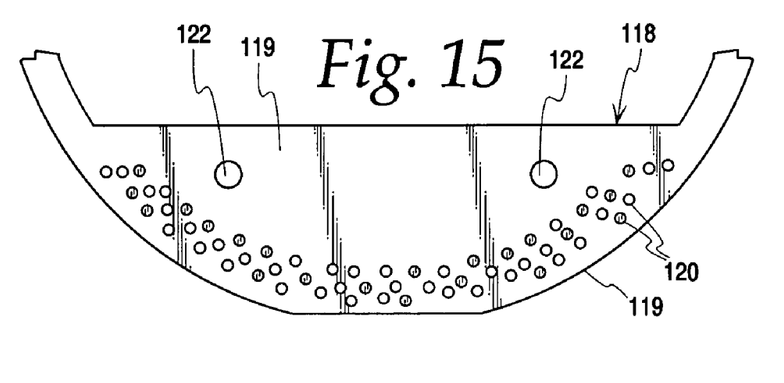
FIG. 15 is a front view of a brush.
Figure 16:
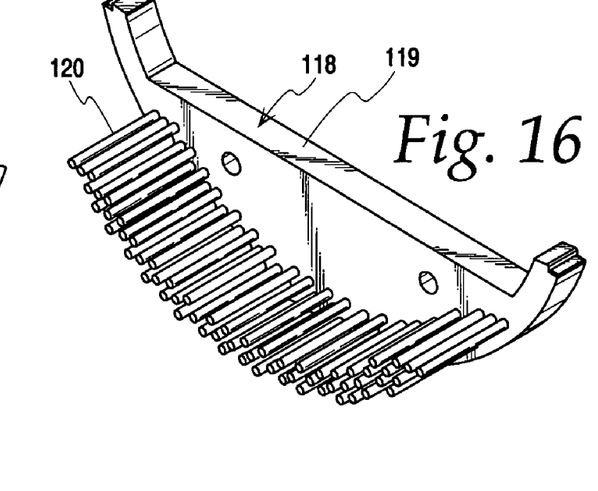
FIG. 16 is a perspective view of the brush.
Figure 17:
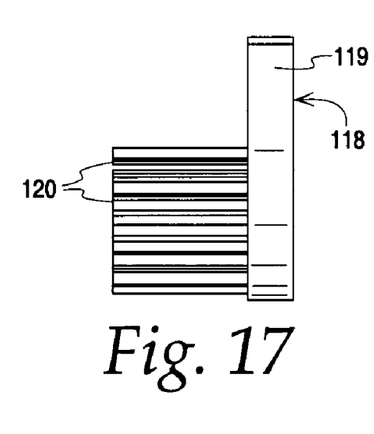
FIG. 17 is a side view of the brush.
Figures 18, 19:
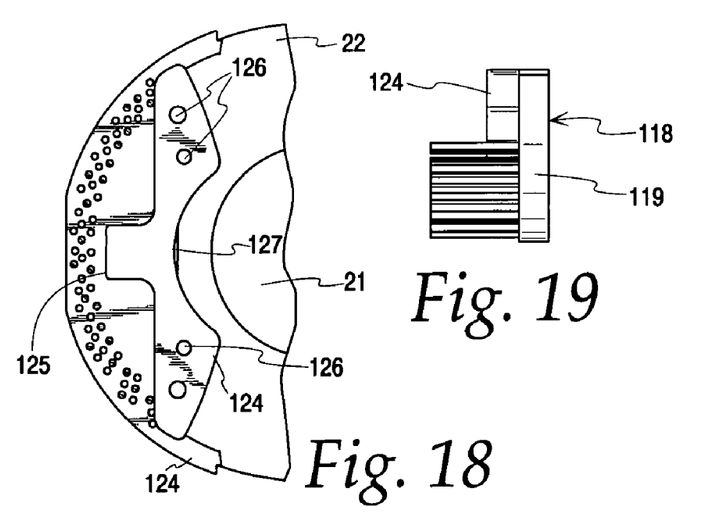
FIG. 18 is a view taken along line 18-18 of FIG. 3.
FIG. 19 is a partial side view of FIG. 18.

FIGS. 2-6 also illustrate the end cap 22. The end cap has screw holes 25 which permit attachment of the end cap to the stationary blade 26, which in turn is fastened to the main plate 94 of the worm body 18. The end cap is a disc-like member having a central counterbore 21 (FIG. 4). A portion of the disc is cut away as can be seen at 23 (FIGS. 3 and 6). Attached to the end cap at the cut away portion is a brush 118. As seen in FIGS. 15-17, the brush includes an arcuate base plate 119 having mounting holes 122 therein. Screws (not shown) mount the base plate 119 to the interior surface of the end cap 22. The base plate carries a plurality of arcuately-arranged bristles 120. Since the base plate is preferably made of plastic, a metal wear plate 124 is attached to the brush as shown in FIGS. 18-19. Details of the wear plate are seen in FIGS. 10 and 11. The wear plate has a projecting tab 125 and a main portion having an arcuate indentation in one side. Mounting holes 126 permit attachment of the wear plate to the end cap. The wear plate is intended to absorb any leftward thrust of the moving blade 28 and prevent wear on the brush or end cap.

The cutting blade assembly is illustrated in FIG. 9. The first or stationary cutting blade 26 has a circular base 106 with a central aperture 109 through it. Bolt holes 108 receive bolts or the like from the end cap for securing the end cap to the stationary cutting blade. Further screw holes 111 allow flat head screws (not shown) to attach the stationary blade to the holes 100 in the main plate 94. When the blade 26 is attached to the main plate the aperture 109 is aligned with the plate's central opening 96. The stationary cutting blade further includes an arm 104 extending from the base 106. A pivot opening is formed near the end of the arm. A sharp cutting edge 105 is formed on the internal edge of the arm.

The second or movable cutting blade 28 has an arcuate segment gear 112 formed along an outer edge of its body 110. A cutting edge 113 is formed along the interior edge of the body. The segment gear terminates at front and rear gear guides 114 and 116. The gear guides are replaceably attached to the segment gear. They act to guide the segment gear 112 into engagement with the drive gear as will be described below. Since the segment gear can be driven fully out of engagement with the drive gear, re-engagement of the two gear may result in momentary clashing which will wear on the first teeth. The gear guides allow replacement of the worn initial teeth without having to replace the entire movable cutting blade. The movable cutting blade includes an extension 117 with a pivot opening formed near its end. This aligns with the corresponding opening in the arm 104. A pivot 102 joins the arm 104 and extension 117 such that the movable cutting blade can rotate about the pivot 102.

Rotation of the movable cutting blade is achieved by the drive assembly 24. The drive assembly is shown in FIG. 7. It includes a worm 64, a worm gear 68 and a drive gear 88. The worm 64 is fixedly mounted on the drive shaft 36. Bearings 60 and 62 are mounted in the worm receiving space 59. A thrust bearing 66 (FIG. 6) abuts the worm 64 and the necked down portion 65 of the housing 18. The worm gear 68 is fixedly mounted on a main shaft 74, as is the drive gear 88. The worm gear is disposed in the gear receiving chamber 90. The threads of the worm 64 engage the teeth 69 of the worm gear 68. As best seen in FIG. 4, the main shaft 74 is supported by three radial bearings, first and second end bearings 76 and 78 and a central bearing 80. It has been found that three bearings are needed to support the load on the main shaft. End bearing 76 is supported in the counterbore of the worm cover 20. End bearing 78 is supported in the counterbore 21 of the end cap 22. Central bearing 80 fits into and is supported in the central aperture 109 of the stationary blade 26. A thrust bearing 86 fits between the hub of the worm gear 68 and the stationary blade base 106. As is evident the drive gear 88 fits between the central bearing 80 and the second end bearing 78.

The use, operation and function of the cable cutter 10 are as follows. First, the cable cutter is attached to the power drill 12. The chuck 14 is opened sufficiently to allow the drive shaft 36 to fit in the chuck. The front end of the drive shaft has flats 38 (FIGS. 2 and 3) which allow the chuck to drivingly engage the drive shaft 36 once the chuck has been tightened. The torque arm clamp 32 is placed into one end of the bore 42 of sleeve 40. Most conveniently the projection 44 of the stabilizer handle 30 is then inserted into the other end of the bore 42 and threaded into the clamp's bore 48 just enough to prevent the handle and clamp from falling out of the sleeve 40. This leaves enough play for the handle and clamp to move laterally, i.e., in a left and right direction, in the sleeve. Then the torque arm 34 is put in place by means of a front-to-rear motion that inserts the front end 56 through the torque arm cross hole 54 and wraps the hook 58 around the drill handle 16. With the hook 58 snug around the handle 16, the stabilizing handle 30 is rotated to fully tighten the torque arm clamp 32. Rotating the handle 30 draws the handle and clamp 32 in toward one another until the torque arm is locked into engagement with, in the illustrated example, the right side edge of the sleeve 40. The cable cutter is then ready to be used. Disengagement of the cable cutter and power drill is accomplished by reversing the above steps.

If the segment gear 112 of the movable blade 28 is not already engaged with the drive gear 88, it can be manually pushed so the front gear guide 114 is in engagement with the drive gear. The movable blade moves past the bristles 120 of the brush in the area of the cut away portion 23 of the end cap 22. A cable 130 (FIG. 7) is placed between the cutting edges 105 and 113 at the point where it is desired to be cut. The drill is activated in the forward direction. This causes rotation of the drive shaft 36 and the worm 64. The worm rotates the worm gear 68, thereby causing rotation of the main shaft 74. The main shaft carries the drive gear 88 with it. Rotation of the drive gear in turn causes rotation of the segment gear 112 and the cutting edge 113 slices into the cable, eventually cutting the cable in two. The drill would typically be reversed at this point to open up the cutting blades for receipt of the next cable to be cut.

Although FIG. 1 illustrates a right-handed configuration whereby a user may position his or her right hand on the power drill handle 14 and the left hand on the stabilizer handle 30, the handle 30 is reversible to make a left-handed set up. A left-handed configuration can be achieved by unscrewing the handle 30 from the torque arm clamp 32 and reversing their positions relative to the sleeve 40. In the left-handed set up the torque arm would be locked into engagement with the left side edge of the sleeve 40. The torque arm 34 would also be flipped over so the shank portion of the torque arm extends past the left side of the drill handle instead of the right side as shown.

Whereas the preferred form of the invention has been shown and described herein, it should be realized that there may be many modifications, substitutions and alterations thereto. For example, the attachment element on the torque arm could have a different form, such as a hook and loop type fastener (e.g., Velcro®, a trademark of Velcro Industries, B.V.) or a buckle with an overcenter latch.

What is claimed is:

1. A cable cutter adapted for attachment to a power drill of the type having a chuck and a handle, comprising:
    a housing having first and second cutting blades connected thereto, the cutting blades being mounted for movement relative to one another;
    a drive assembly consisting essentially of a drive shaft mounted for rotation in the housing and extending therefrom for releasable connection to the drill chuck, a first gear mounted for rotation with the drive shaft, a main shaft mounted for rotation in the housing, a second gear mounted for rotation with the main shaft and in engagement with the first gear, and a drive gear mounted for rotation with the main shaft and engageable with one of the cutting blades; and
    a stabilizing handle, a torque arm, a sleeve attached to the housing and having a hollow bore extending laterally of the housing and fully through the sleeve, a torque arm clamp sized to fit into the hollow bore and having a fastening element which is releasably engageable with the torque arm, one end of the stabilizing handle being sized to fit into the hollow bore and releasably engage the torque arm clamp.

2. A cable cutter adapted for attachment to a power drill of the type having a chuck extending from a drill housing, and a handle having a grip portion extending below the drill housing, the cable cutter comprising:
    a housing defining left and right lateral sides;
    a stabilizing handle removably all attached to the housing such that it can extend either beyond the left lateral side or beyond the right lateral side;
    first and second cutting blades, at least one of which is connected to the housing, the blades being mounted for movement relative to one another;
    a drive assembly including a drive shaft mounted for rotation in the housing and extending therefrom so as to be releasably engageable with the chuck of the power drill, a first gear mounted on the drive shaft for rotation therewith, a main shaft mounted for rotation in the housing, a second gear being in engagement with the first gear and mounted on the main shaft for rotation therewith, and a drive gear mounted on the main shaft for rotation therewith and engageable with one of the cutting blades for moving the blades relative to one another; and
    a torque arm attached at one end to the housing and having an attachment element at the other end which is adapted for engagement with the grip portion of the handle of the drill, the attachment element including a first portion which, when the torque arm is installed, is adjacent one lateral side of the grip portion, a second portion which is adjacent the other lateral side of the grip portion, and a third portion connecting the first and second portions; and
    a sleeve attached to the housing and having a hollow bore extending laterally of the housing and fully through the sleeve, a torque arm clamp sized to fit into the hollow bore and having a fastening element which is releasably engageable with the torque arm, one end of the stabilizing handle being sized to fit into the hollow bore and releasably engage the torque arm clamp.

* * * * *